(12) United States Patent
Richman et al.

(10) Patent No.: US 6,364,010 B1
(45) Date of Patent: Apr. 2, 2002

(54) DEVICE TO PROVIDE HEATED WASHER FLUID

(75) Inventors: Lee Richman, Long Island City, NY (US); John Petitt, Basking Ridge, NJ (US)

(73) Assignee: The Consortium for Technology Licensing, Ltd., Nissequogue, NY (US)

( * ) Notice: Subject to any disclaimer, the term of this patent is extended or adjusted under 35 U.S.C. 154(b) by 0 days.

(21) Appl. No.: 09/586,208

(22) Filed: Jun. 2, 2000

(51) Int. Cl.[7] .............................. B60H 1/06; B60H 1/08; F28D 7/10
(52) U.S. Cl. ....................... 165/202; 165/289; 165/290; 165/297; 165/298; 165/41; 165/51; 239/129; 239/130; 237/12.3 R; 123/557
(58) Field of Search ........................... 165/41, 51, 289, 165/290, 298, 297; 237/12.3 R; 239/129, 130; 123/557

(56) References Cited

U.S. PATENT DOCUMENTS

| | | | | |
|---|---|---|---|---|
| 3,472,214 A | * | 10/1969 | Moon ......................... 165/298 |
| 4,338,891 A | * | 7/1982 | Blitz ........................... 165/51 |
| 4,354,548 A | * | 10/1982 | Carlsson ...................... 165/41 |
| 4,436,075 A | * | 3/1984 | Campbell et al. ............. 165/51 |
| 4,476,839 A | * | 10/1984 | Niblett ......................... 165/51 |
| 4,562,890 A | * | 1/1986 | Matoba ......................... 165/41 |
| 4,575,003 A | * | 3/1986 | Linker .......................... 165/41 |
| 4,582,040 A | * | 4/1986 | Niblett ......................... 165/51 |
| 4,593,753 A | * | 6/1986 | McConnell ................... 165/51 |
| 4,694,891 A | * | 9/1987 | Okumura et al. ............. 165/41 |
| 4,862,951 A | * | 9/1989 | Müller et al. ................. 165/51 |
| 4,944,343 A | * | 7/1990 | Müller ......................... 165/51 |
| 5,183,099 A | * | 2/1993 | Bechu .......................... 165/41 |
| 5,522,453 A | * | 6/1996 | Green .......................... 165/41 |

* cited by examiner

Primary Examiner—John K. Ford
(74) Attorney, Agent, or Firm—Proskauer Rose LLP

(57) ABSTRACT

An apparatus and method for improving the cleaning and deicing effectiveness of a washer fluid in a motor vehicle before spraying it against a windshield, headlamps, etc., utilizes the heat from the engine coolant to elevate the temperature of the washer fluid. In addition, a mixing valve arrangement is used to maintain the temperature of the heated washer fluid at a predetermined difference value from that of the windshield, etc., outside surface. The cleaning effectiveness of the heated washer fluid is superior to that of ambient temperature washer fluid, and is also advantageous for deicing purposes.

13 Claims, 3 Drawing Sheets

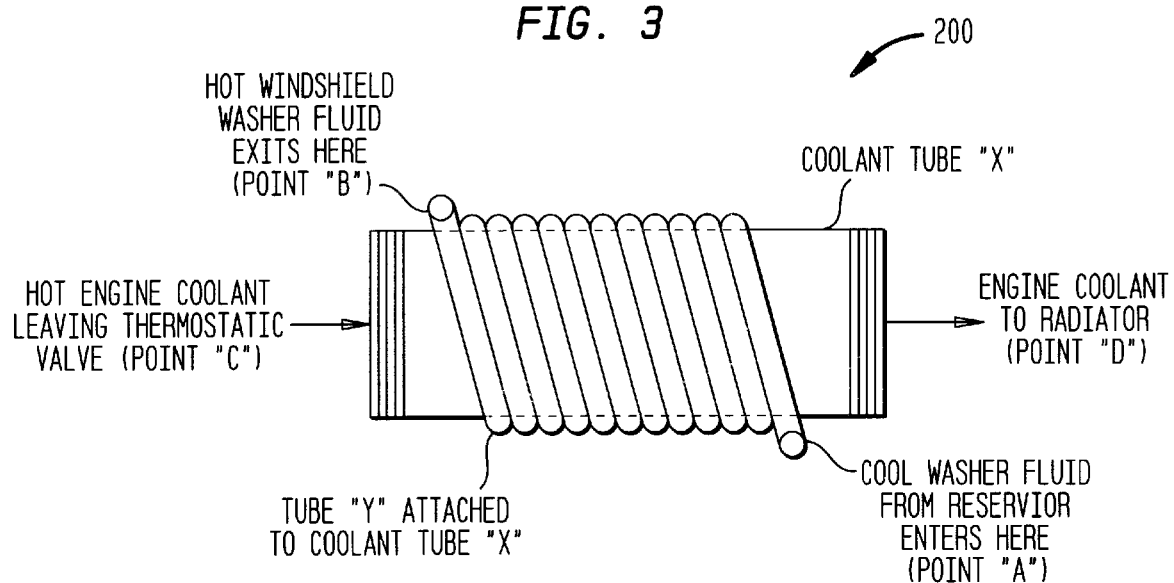
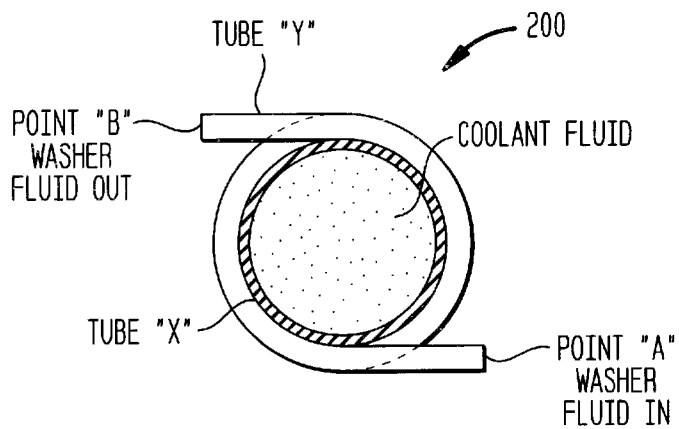

DEVICE TO PROVIDE HEATED WASHER FLUID

FIELD OF THE INVENTION

The present invention relates to an apparatus and method for improving the effectiveness of a washer fluid, such as that used in a motor vehicle. More specifically, the present invention relates to an apparatus and method for heating a washer fluid in an automobile, where the washer fluid is used for cleaning the windshield, headlamps, or other dirt-collecting surfaces.

BACKGROUND OF THE INVENTION

The windshield of an automobile requires cleaning at various times to insure clear vision. For this purpose, windshield washer fluid is typically pumped from a reservoir to a pair of spray nozzles directed at the windshield, and the windshield wipers are activated to effect the cleaning process.

A simplified diagram of both a typical automotive cooling system and a typical windshield washer system is depicted in FIG. 1. An engine coolant medium, e.g., ethylene glycol and water, is circulated by a water pump (not shown) through an engine block coolant jacket 100 to a thermostatic control valve 102, which is typically set for a temperature around 190° F. Valve 102 outputs a portion of the coolant to a radiator 104 (point "E"), and the remainder is returned to jacket 100 for temperature control. Radiator 104 dissipates heat from the engine coolant, and returns the coolant at a reduced temperature (point "F") to coolant (water) jacket 100.

Independently, a washer fluid reservoir 106 provides washer fluid at ambient temperature to a washer fluid pump (not shown) on demand from the vehicle operator. When activated, the washer fluid pump directs the washer fluid to a set of spray nozzles 108, which eject the washer fluid against a windshield 110. Simultaneously, windshield wipers are turned on, to implement the windshield cleaning process in conjunction with the washer fluid spray.

However, some types of external detritus, such as ice and insects, can impede the cleaning action of the windshield wipers when used with washer fluid at ambient temperature. Moreover, it is well known that most cleaning solutions, such as washer fluid, are much more effective when heated, and especially so for deicing purposes. Accordingly, it is an object of the present invention to provide a simple and economic apparatus and method for heating the washer fluid in a motor vehicle, in order to improve its cleaning effectiveness.

SUMMARY OF THE INVENTION

In accordance with an illustrative embodiment of the present invention, an apparatus and method for heating a washer fluid in a motor vehicle uses the heat from the engine coolant in the motor vehicle. This is achieved by flowing the ambient temperature washer fluid through a coil tubing wrapped around a tube carrying the engine coolant exiting the engine block at elevated temperature. Both the washer fluid tubing and the engine coolant tube are made of thermally conductive material, so that the washer fluid flowing through the coil tubing is heated by the elevated temperature of the engine coolant. The heated washer fluid is then directed against a windshield, or other dirt-collecting surface, such as headlamps.

To further control the temperature of the washer fluid being directed at the dirt-collecting surface, a mixing valve is introduced into the heated washer fluid line. The mixing valve is controlled by temperature sensors which monitor the outside surface temperature of the dirt-collecting surface, and the heated washer fluid temperature. Based on a predetermined desired temperature differential, the mixing valve combines heated washer fluid with ambient temperature washer fluid and outputs a washer fluid mixture at the desired temperature value. This washer fluid mixture is then directed at the dirt-collecting surface.

An illustrative embodiment of the present invention is more fully described below in conjunction with the following drawings.

BRIEF DESCRIPTION OF THE DRAWINGS

FIG. 3 illustrates a side elevation of the inventive heating apparatus.

FIG. 4 illustrates an end view of the inventive heating apparatus.

DETAILED DESCRIPTION OF THE INVENTION

Figure 1:
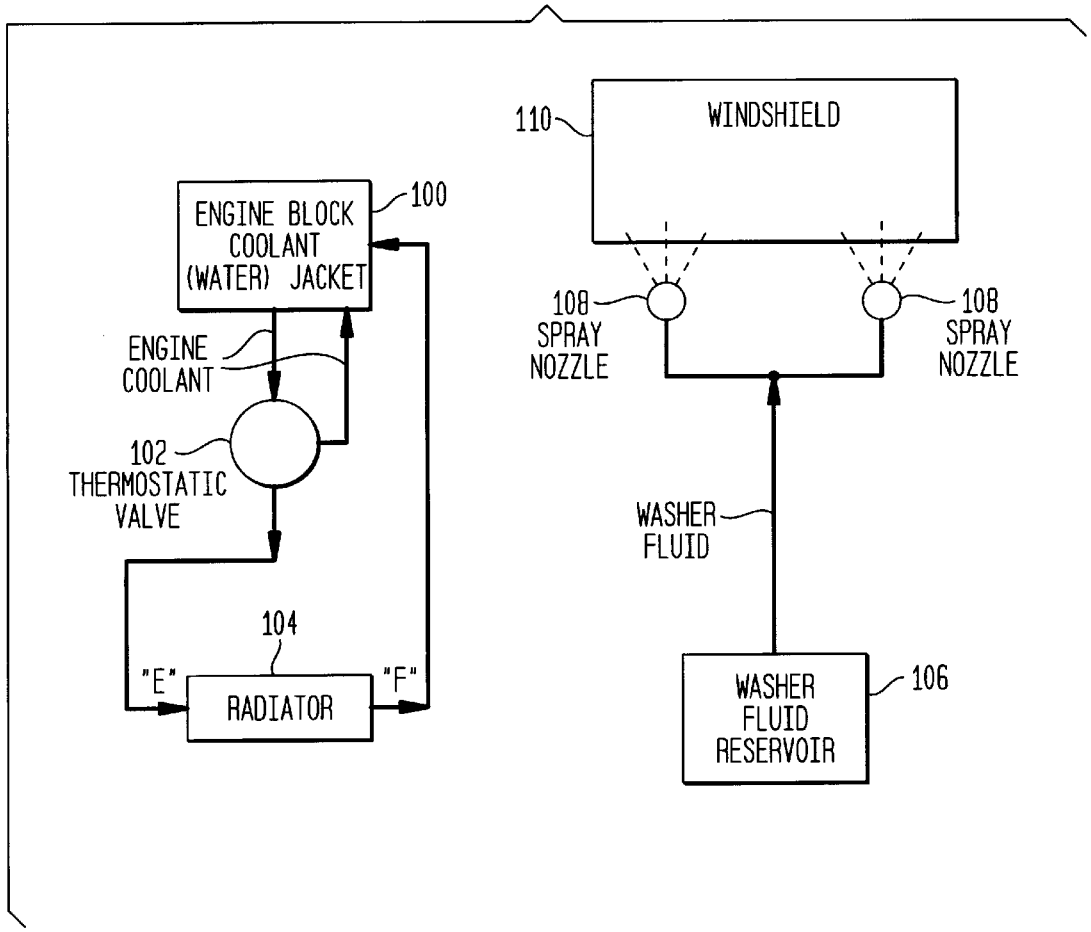
FIG. 1 depicts a prior art windshield washer configuration, along with a prior art automatic cooling system configuration.
Figure 2:
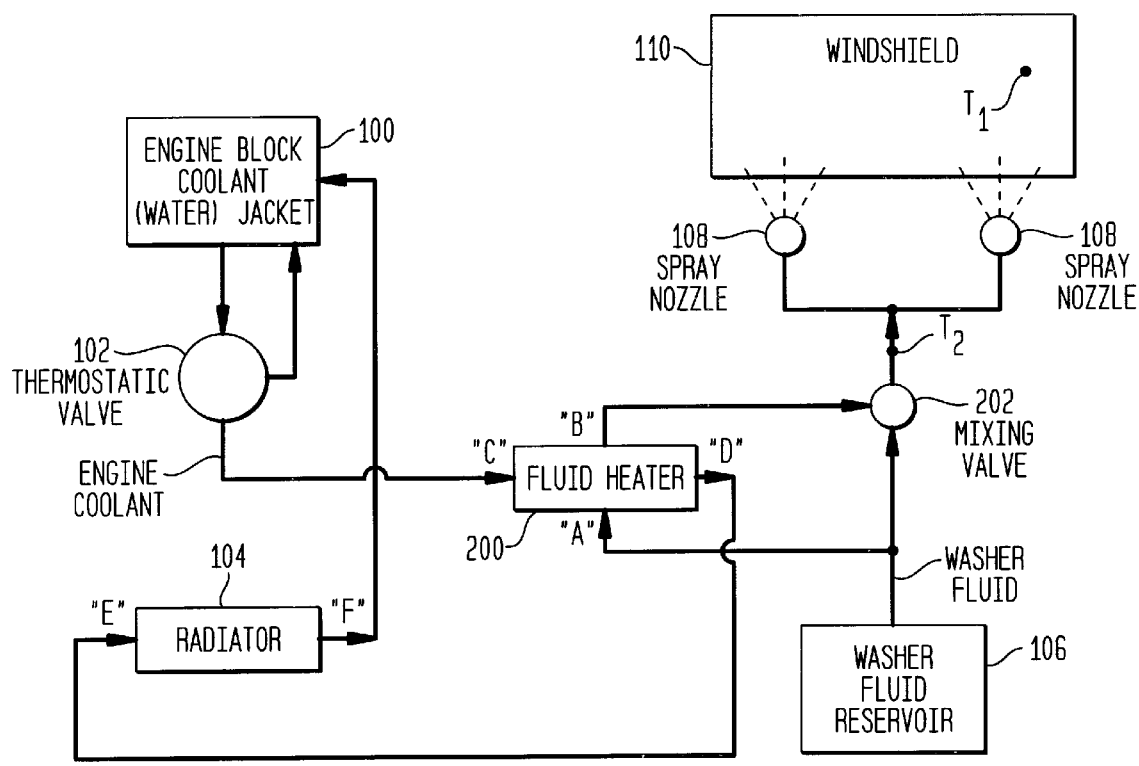
FIG. 2 depicts a heated windshield washer configuration, in accordance with the present invention.

The inventive apparatus and method is illustrated in FIG. 2, as a modification of the prior art configuration of FIG. 1. As shown in FIG. 2, a fluid heater device 200 is inserted in the (high temperature) coolant line between valve 102 and radiator 104. While the heated engine coolant flows through the main body (e.g., tubular) of fluid heater 200 (from point "C" to point "D"), the washer fluid from reservoir 106 is directed to flow through an ancillary conduit of fluid heater 200 (from point "A" to point "B"), such as a tubular coil wrapped around the outside of the main tubular body of fluid heater 200.

Both the main body and ancillary conduit of fluid heater 200 are constructed from thermally conductive materials, such that the washer fluid flowing through fluid heater 200 is heated by the elevated temperature of the engine coolant flowing through fluid heater 200.

The heated washer fluid is then directed to a mixing valve 202, where it is mixed with ambient temperature washer fluid from reservoir 106, in order to maintain a desired washer fluid temperature with respect to the windshield temperature. To implement the washer fluid temperature control, for example, temperature sensors (not shown) may be placed on the windshield surface and in the washer fluid line leading to the spray nozzles 108, as indicated by temperature measurement points T1 and T2, respectively. A controller (not shown) receives the temperature readings and adjusts the mixing valve 202 to obtain the desired output washer fluid temperature. Illustratively, a relationship such as T2=(T1+40), in degrees F., can be used to maintain a desired temperature difference between the washer fluid and the windshield surface.

One embodiment of the inventive fluid heater 200 is shown in detail in FIGS. 3 and 4. The main body of fluid heater 200 is designated as Coolant Tube "X", and the ancillary conduit of fluid heater 200 is designated as Tube "Y". Heated engine coolant from thermostatic valve 102 (FIG. 2) is directed into Coolant Tube "X" at point "C", and exits at point "D". Washer fluid at ambient temperature is directed from fluid reservoir 106 (FIG. 2) into Tube "Y" at point "A", is heated by thermal conduction from Coolant Tube "X", and exits at point "B".

As shown in FIG. 3, Tube "Y" can be a separate tube coiled around Coolant Tube "X", or it can be any suitable configuration, such as a one-piece cast design. Importantly, the physical configuration of Tube "Y" should maximize the heat transfer from the engine coolant in Coolant Tube "X" to the washer fluid flowing through Tube "Y".

Fluid heater 200 can be constructed of a variety of materials; however, chemical interaction considerations would indicate that aluminum is a preferred choice.

Since it is envisioned that fluid heater 200 could be retrofitted into existing vehicles, the inventive unit can be constructed with hose barbs to simplify attachment in the field.

To further illustrate the operation of the present invention, a group of scenarios are presented below, which indicate various approximate temperature measurements related to the inventive fluid heater 200 (FIGS. 2, 3, 4) and the other components of FIG. 2, under four different sets of driving conditions. For each scenario, it is assumed that mixing valve 202 is controlled for the condition T2=(T1+40).

Scenario 1
A. Driving conditions:
   Engine running warm (not hot)
   Outside temperature=0° F.
B. Temperature measurements:
   Engine block (coolant) water jacket 100 temperature= 120° F.
   Engine coolant entering Coolant Tube "X" (point "C")=60° F.
   Engine coolant leaving Coolant Tube "X" (point "D")= 60° F.
   Engine coolant entering radiator 104 (point "E")=60° F.
   Engine coolant leaving radiator 104 (point "F")=58° F.
   Washer fluid entering Tube "Y" (point "A")=0° F.
   Washer fluid leaving Tube "Y" (point "B")=45° F.
   Washer fluid entering windshield washer spray nozzles, after mixing valve 202 (T2)=40° F.
   Windshield surface (T1)=0° F.
   Washer fluid contacting the windshield surface=35° F.

Scenario 2
A. Driving conditions:
   Engine running hot
   Outside temperature=0° F.
B. Temperature measurements:
   Engine block water jacket 100 temperature=200° F.
   Engine coolant entering Coolant Tube "X" (point "C")=200° F.
   Engine coolant leaving Coolant Tube "X" (point "D")= 195° F.
   Engine coolant entering radiator 104 (point "E")=195° F.
   Engine coolant leaving radiator 104 point "F")=175° F.
   Washer fluid entering Tube "Y" (point "A")=0° F.
   Washer fluid leaving Tube "Y" (point "B")=70° F.
   Washer fluid entering windshield washer spray nozzles, after mixing valve 202 (T2)=40° F.
   Windshield surface (T1)=0° F.
   Washer fluid contacting the windshield surface=35° F.

Scenario 3
A. Driving conditions:
   Engine running hot
   Outside temperature=50° F.
B. Temperature measurements:
   Engine block (coolant) water jacket 100 temperature= 200° F.
   Engine coolant entering Coolant Tube "X"(point "C")= 200° F.
   Engine coolant leaving Coolant Tube "X"(point "D")= 195° F.
   Engine coolant entering radiator 104 (point "EE")= 195° F.
   Engine coolant leaving radiator 104 (point "F")=175° F.
   Washer fluid entering Tube "Y" (point "A")=50° F.
   Washer fluid leaving Tube "Y" (point "B")=100° F.
   Washer fluid entering windshield washer spray nozzles, after mixing valve 202 (T2)=90° F.
   Windshield surface (T1)=50° F.
   Washer fluid contacting the windshield surface=85° F.

Scenario 4
A. Driving conditions:
   Engine running hot
   Outside temperature=95° F.
B. Temperature measurements:
   Engine block (coolant) water jacket 100 temperature= 200° F.
   Engine coolant entering Coolant Tube "X" (point "C")=200° F.
   Engine coolant leaving Coolant Tube "X" (point "D")= 195° F.
   Engine coolant entering radiator 104 (point "E")=195° F.
   Engine coolant leaving "radiator 104" (point "F")= 175° F.
   Washer fluid entering Tube "Y" (point "A")=95° F.
   Washer fluid leaving Tube "Y" (point "B")=140° F.
   Washer fluid entering windshield washer spray nozzles, after mixing valve 202 (T2)=135° F.
   Windshield surface (T1)=95° F.
   Washer fluid contacting the windshield surface=130° F.

In short, an apparatus and method are disclosed for heating a washer fluid in a motor vehicle before spraying it against a windshield, headlamps, etc. Moreover, the disclosed heating device utilizes the heat from the engine coolant, so that no additional heat source is required. In addition, a mixing valve arrangement is disclosed which maintains the temperature of the heated washer fluid at a predetermined difference value from that of the windshield outside surface.

The above described embodiments of the invention are intended to be illustrative only. Numerous alternative embodiments may be devised by those skilled in the art without departing from the spirit and scope of the following claims.

What is claimed is:

1. In a motor vehicle, an apparatus for heating washer fluid from an engine coolant, comprising:
   a first conduit for carrying said engine coolant from an input end to an output end,
   a second conduit for carrying said washer fluid from a first end to a second end, said second conduit being thermally coupled to said first conduit,
   a washer fluid mixing valve, having a first input line for receiving heated washer fluid from said second end of said second conduit, a second input line for receiving washer fluid at ambient temperature, and a single output line,
   a first temperature sensor, attached to an outside surface of said motor vehicle for reading a temperature T1, a second temperature sensor, attached to said single output line of said washer fluid mixing valve for reading a temperature T2, and a valve controller, connected to said temperature sensors and to said washer fluid mixing valve, wherein said valve controller causes said washer fluid mixing valve to maintain a desired washer fluid temperature at said single output line by adjusting said washer fluid inputs at said first and second input lines, wherein the temperature of said washer fluid exiting said second end of said second conduit is elevated from the temperature of said washer fluid entering said first end of said second conduit by thermal conduction from said engine coolant in said first conduit.

2. The apparatus of claim 1, wherein said engine coolant is used to cool an engine in said motor vehicle, said engine coolant flowing through said first conduit deriving said elevated temperature from the heat dissipated by said motor vehicle engine.

3. The apparatus of claim 2 wherein said heated washer fluid exiting said second end of said second conduit is directed at the outside surface of one of a dirt-collecting item and ice-collecting item of said motor vehicle.

4. The apparatus of claim 1 wherein said valve controller maintains the condition where T2=(T1+n), in degrees, where n is a desired number in degrees.

5. The apparatus of claim 3, wherein said first temperature sensor is attached to said outside surface of said one of a dirt-collecting item and ice-collecting item for reading a temperature T1.

6. The apparatus of claim 5, wherein said one of a dirt-collecting item and ice-collecting item is at least one of a windshield and headlamps.

7. The apparatus of claim 4, wherein said n is approximately 40.

8. The apparatus of claim 1, wherein said desired washer fluid temperature is variably controlled.

9. In a motor vehicle, a method for heating an ambient temperature washer fluid from an elevated temperature engine coolant, comprising the steps of:

a) flowing said elevated temperature engine coolant through a first thermally conductive conduit, b) flowing said ambient temperature washer fluid through a second thermally conductive conduit, said second thermally conductive conduit being thermally coupled to said first thermally conductive conduit, c) sensing the temperature of an outside surface of said motor vehicle, d) sensing the temperature of said washer fluid at elevated temperature, and e) based on the temperatures measured in steps c) and d), mixing a portion of said washer fluid at elevated temperature with a portion of said ambient temperature washer fluid to achieve a washer fluid mixture at a desired temperature difference between said washer fluid mixture and said outside surface, wherein said washer fluid mixture is directed at said outside surface, wherein said elevated temperature engine coolant flowing through said first thermally conductive conduit causes said ambient temperature washer fluid flowing through said second thermally conductive conduit to become elevated in temperature by thermal conduction.

10. The method of claim 9, wherein said engine coolant temperature is elevated due to the heat dissipated by an engine in said motor vehicle.

11. The method of claim 9 wherein the step of sensing the temperature of said outside surface occurs at the outside surface of one of a dirt-collecting item and ice-collecting item of said motor vehicle.

12. The apparatus of claim 11, wherein said one of a dirt-collecting item and ice-collecting item is at least one of a windshield and headlamps.

13. The method of claim 9, wherein desired temperature difference is variably controlled.

* * * * *